United States Patent [19]
Cardillo

[11] Patent Number: 5,839,354
[45] Date of Patent: Nov. 24, 1998

[54] REVOLVING TOASTER APPARATUS

[76] Inventor: Alfredo Cardillo, 16751 Curtis, Roseville, Mich. 48066

[21] Appl. No.: 648,364

[22] Filed: May 15, 1996

[51] Int. Cl.$^6$ .................................................. A47J 37/08
[52] U.S. Cl. ..................... 99/329 RT; 99/341; 99/386; 99/391; 99/443 C
[58] Field of Search ................. 99/386, 387, 443 C, 99/391, 329 RT, 329 P, 341; 219/388, 391, 395

[56] References Cited

U.S. PATENT DOCUMENTS

| | | | |
|---|---|---|---|
| 1,536,538 | 5/1925 | Stouffer | 99/386 |
| 1,555,336 | 9/1925 | Vaughan | 99/386 X |
| 1,678,337 | 7/1928 | Halifax | 99/387 |
| 2,014,595 | 9/1935 | Simmons | 99/387 X |
| 4,044,660 | 8/1977 | Montague et al. | 99/387 X |
| 5,473,975 | 12/1995 | Bruno et al. | 99/386 X |

*Primary Examiner*—Reginald L. Alexander
*Attorney, Agent, or Firm*—Harness, Dickey & Pierce, P.L.C.

[57] ABSTRACT

A novel toaster for everyday household use comprises a conveyor which carries items to be toasted past electrical heating panels. The toaster has an entrance wherein the item is inserted vertically from a fed tray onto the conveyor. The heating panels, placed above and below the toasting cavity, heat to a constant temperature wherein the level of toasting is controlled by setting the travel speed of the conveyor. The apparatus is encompassed by a rectangular body shell and has a translucent door for side access. Additionally, the body has a butter well located in the top surface. Butter is placed in the well which has a plurality of apertures for allowing the butter to drip onto the passing food item below. The well absorbs the ambient heat from the appliance to facilitate the butter meltdown.

20 Claims, 2 Drawing Sheets

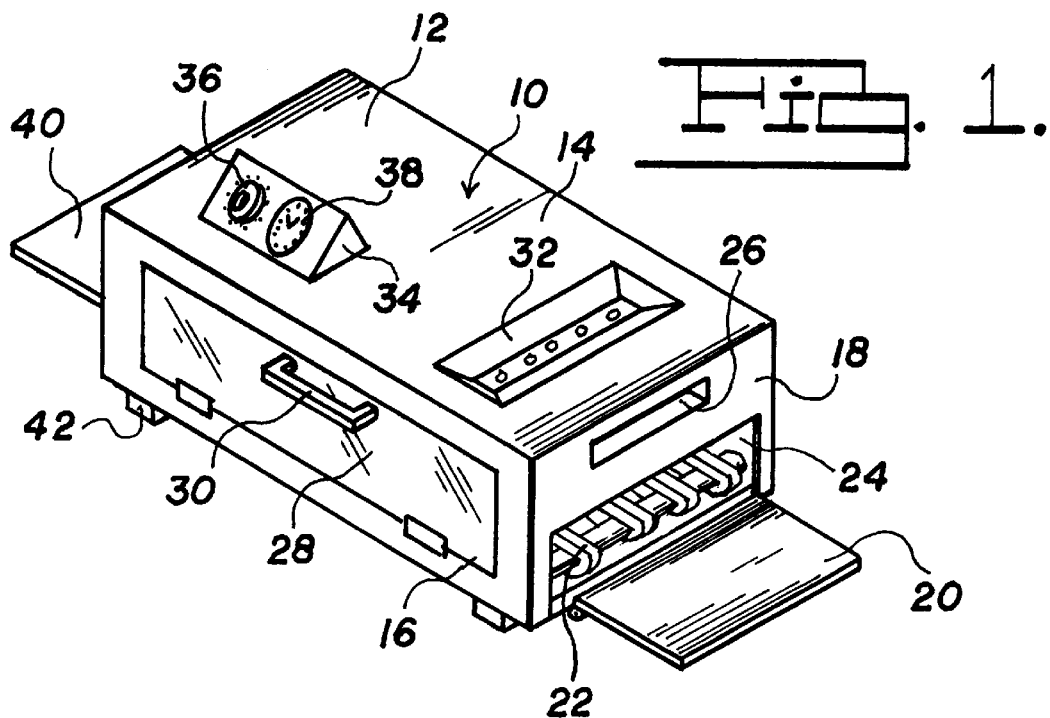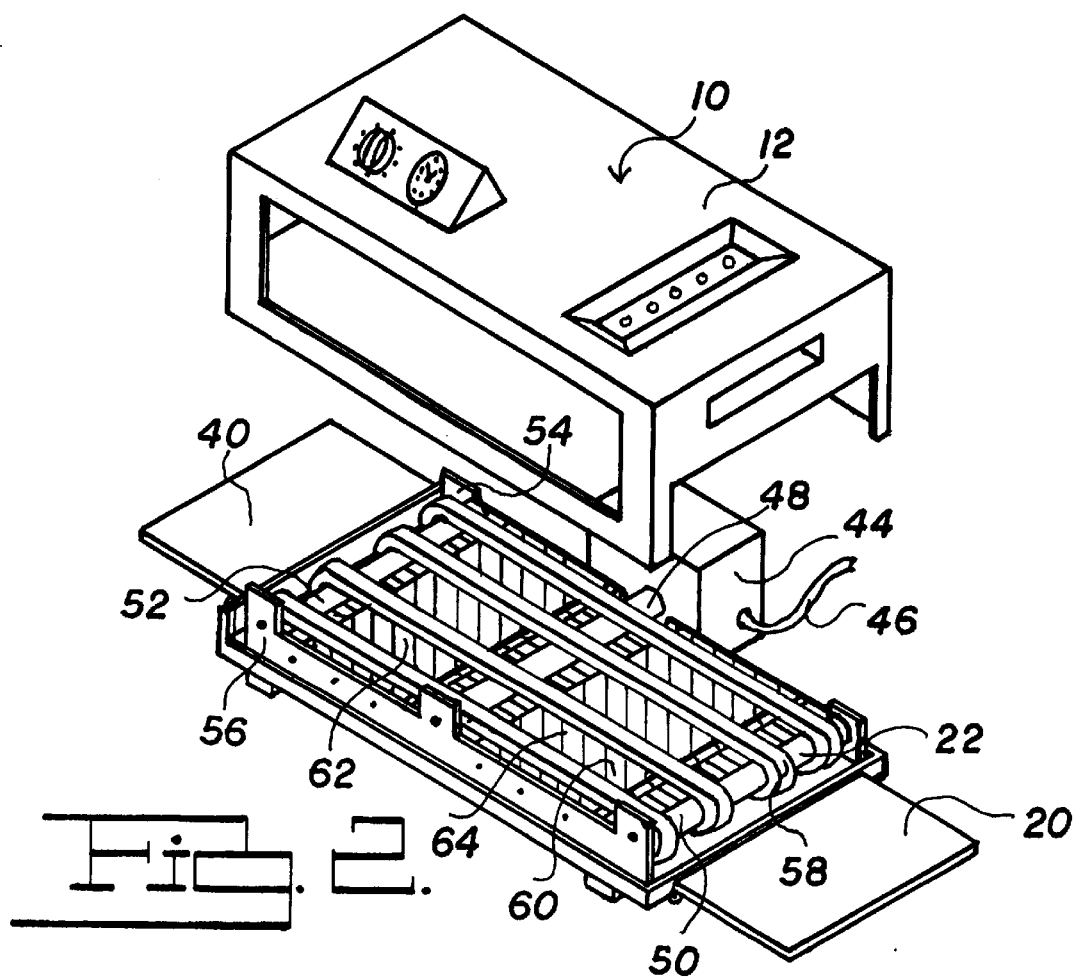

REVOLVING TOASTER APPARATUS

TECHNICAL FIELD

This invention relates in general to household appliances, and more particularly to appliances used to make toast.

BACKGROUND OF THE INVENTION

Prior to the present invention, one who desires toast with any particular meal, or just toast by itself, was subject to the problematic household toaster. These household toasters come in a wide array of sizes and shapes, and are generally electric.

The prior toasters, generally situated on a table or kitchen counter, all have vertical slots in the top for receiving individual slices of bread. A sliding spring-loaded lever extending from the side of the toaster, is then depressed thereby lowering the slices into the heat cavities relative to the aforementioned receiving slots.

Once depressed all the way, a heat actuated catch means holds the bread perch's in place while electrical heating elements, which surround the walls of the bread cavities, bake the outer surfaces of the bread slices. The toast can generally be toasted to different consistencies ranging from light to dark, by adjusting a lever connected to the heat actuated catch means.

This type of control for producing a desired toast consistency, is very faulty and generally fails after a few batches of toast are made. In many instances, even the catch means fails thereby requiring the user to manually maintain the bread within the cavity by holding the spring-loaded lever at its lowest elevation.

Another problem with common household toasters is the everyday occurrence of burning the toast. This is very unpleasant and can create a fire hazzard, as well as noxious smoke and the loss of the bread. Also in some circumstances, the baking range of the toaster does not allow for the complete baking requirements of other products available for use with a common household toaster. These products include pastries and waffles, as well as muffins and bagels.

Another problem with common household toasters is the occurrence of bread, or other items, becoming stuck within the baking cavity which causes the appliance to remain in the baking mode. If left unattended for any length of time, the item will burn and the toaster itself can reach temperatures causing possible fire and electrical failure.

A main object of the present invention is to provide an electrical apparatus that allows one to insert bread slices flat into an opening at one end of the device, watch it travel through upper and lower heat filament banks on a revolving oven rack, and exit through an opening at the opposing end of the device. The apparatus has a knob for setting the speed of the oven rack thereby allowing one the ability of selecting the desired baking consistency by determining the length of time the item spends within the oven cavity.

Another object of the present invention is to provide a means for allowing one to apply butter to the top surface of the item. As the butter is applied during the baking process, the item has more of a baked in butter flavor, and one eliminates the mess associated with buttering toast.

While a further object of the present invention is to provide a toasting apparatus that has a bigger access opening for communicating with other toaster items generally larger than a slice of bread. These items may include pizza rolls or dinner buns.

While it is a further object of the present invention to provide a trip mechanism for starting the apparatus, and for alerting one that the toasting cycle has been completed and the apparatus has shut itself off.

A final object of the present invention is to provide a timer for use with placing the oven rack in a fixed position while stationary baking is needed. A translucent door is lowered and the item to be baked is placed centrally on the oven rack. The timer is then set to a specific reference for that item to be baked. When the baking cycle has been completed, the timing mechanism shuts off the heat filament banks, and sounds a bell.

SUMMARY OF THE INVENTION

In light of the foregoing problems with common household toasters, and to fulfill the above-stated objects, there is provided, according to one aspect of the present invention, a new and improved household toaster which utilizes a segmented conveyor for carrying items to be toasted, through opposing upper and lower heating filaments. The toasted item is them discharged through an exit in the side of the device.

A main embodiment of the present invention comprises a rectangular shell having a translucent door at the frontal wall area. Located at the side walls are a first opening, for inserting slices of bread, and a second opening for receiving the slice once the toasting cycle has been completed.

A segmented chain conveyance, driven by sprocket axle attached to an electric motor, supports the item to be toasted and has a control dial for determining the conveyor speed. The slower the conveyor speed the longer the item remains between the heating filaments, therefore allowing one the ability to have more well cooked items, or where longer cooking time is required per item.

The toaster also has rubber support pads for placement on a counter top or table. Located directly above the openings in the side walls are handgrip cavities for easy transport of the device. Each opening also has a folding tray which flips down to support the item to be toasted, either going in or coming out of the toaster.

Located along the top surface of the present invention is a butter well which has a plurality of seepage apertures. As an item passes below the seepage apertures, melted butter drips onto the toasted surface. After the item passes, a catch pan collects the unused butter.

Also located along the top surface of the toaster is a timer and clock. The timer is activated by a dial which controls the conveyor speed. The clock is a convenience item for the user.

Extending from the rearward wall of the embodiment is a drive assembly. The assembly is electrical and runs on 110 household current. The assembly further comprises a variable speed electric motor housed in a separate shell to prevent toast debris from infiltrating the area. Extending from the motor compartment, and transversing the conveyor segments, is a drive axle having sprockets which communicate with the individual conveyor segments to propel the assembly.

A series of heating filament sheets are situated at the ceiling and floor areas of the embodiment and are there supported by non-conducting insulators. The individual filaments are evenly spaced apart by helically winding the filament wire over the sheet. A series of notches located along the edges of the sheet, receive the filament line as it is wrapped there around.

Additionally, the timer, when at the zero position, can be rotated counter-clockwise thereby maintaining the conveyor at a stationary position while still allowing the user the ability to have a timing feature. This feature would be useful when items requiring more cooking time are desired. In this situation, the user simply lowers the door an inserts the item directly onto the oven conveyor.

BRIEF DESCRIPTION OF THE DRAWINGS

In the drawings where like reference numerals are used to indicate identical components in the various figures:

FIG. 1 is a perspective drawing of the preferred embodiment.

FIG. 2 is partially exploded perspective view of the preferred embodiment.

FIG. 5 is a perspective side view of the preferred embodiment, and further showing the exiting of a toasted item there from.

DETAILED DESCRIPTION OF THE EMBODIMENTS

Figure 3:
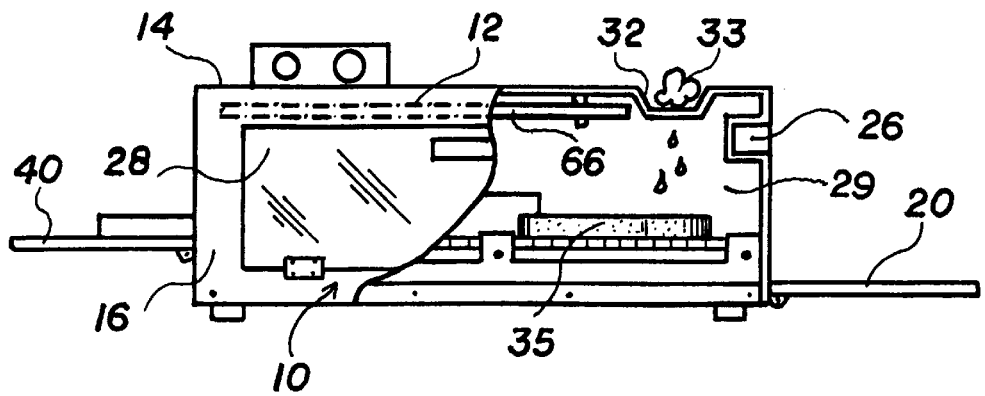
FIG. 3 is a frontal elevational cut-away view, of the preferred embodiment. Also depicted is the buttering process as applied to an item being toasted.

With combined reference to all the figures, a conveyor toaster is generally denoted by the numeral 10. As seen in FIG. 1, the toaster 10 has a rectangular body 12. The body 12 has a top surface area 14, a frontal wall 16, and a side wall 18. Extending outward from the side wall 18 is the tray support 20 which receives the slice of bread once it is toasted. To facilitate the process, slices of bread are fed from a tray 40 to a conveyor assembly 22. The conveyor assembly 40 has a control dial 36 which is used to increase, or decrease, the speed of such thereby determining the duration the slice of bread spends being toasted. The toasted bread then exits the toaster 10 through an opening 24 in the side wall 18. Situated next to the control dial 36 is a clock 38 thereby comprising the control/clock assembly 34.

Opposing hand holds 26 (one of two shown), allow on to easily move the appliance 10 when needed. Situated in the top surface 14 is a butter well 32 which holds butter for dispersion to slices of bread as they pass under. Located in the front wall 16 of the appliance 10 is a hinged door 28 having a handle 30 for opening and closing. This feature allows one access when baking in a stationary position. The entire assembly is supported by a series of resilient pads 42 which control slippage and shock upon displacement to any normal planer surface.

As seen in FIG. 2, the appliance 10 has the body 12 separated from a unitary base 13. The unitary base 13 further comprises a conveyor assembly 22 which is driven by an electric motor 44 having an electricity supply line 46. The conveyor assembly 22 has a series of chain linked segments 58 which are held in a fixed rotation by opposing free axles 50 and 52. The axles, 50 and 52, are supported by tabs 54 and 56. A drive axle 48 extends parallel and intermediate of the opposing free axles 50 and 52, and is propelled by the motor 44. The functioning portion of the embodiment is shown in heating panels 60 and 62 and are laced with electrical filaments 64. The panels 60 and 62 (2 of 3 here shown), are mounted to tabs 54 and 56 intermediate of the chain segments 58. Opposing tray members 40 and 20 are hinged to the unitary base and are used to support slices of bread going into, and out of the appliance.

FIG. 3 shows the embodiment 10 with the front wall 16 partially cutaway. The body 12 of the appliance 10 further comprises a top surface 14 having a well feature 32 for melting and dispersing butter 33 to the conveying slice of toasted bread 35. The upper heating panel 66 (third of three), being in close proximity to the well 32 heats the butter 33 to a liquefied point consistent with dripping on the bread 35. The heating panel 66 also bakes the top of the bread slice 35 which is fed into the appliance 10 from a tray 40. When the toasting cycle has been completed, the bread slice 35 exits onto the tray 20. Also depicted is the hand well 26 (one of two here shown), which allows one to easily grip the appliance 10 when moving it from one area to another. Located in the front wall 16 is a hinged translucent door 28 which is used to access the baking compartment 29.

Figure 4:
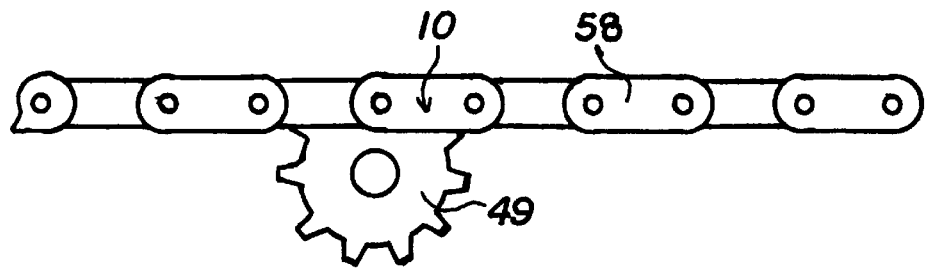
FIG. 4 is a fragmentary elevational view of an individual drive chain and drive sprocket.

As seen in FIG. 4, a fragmentary portion of the chain linked segment 58 of the embodiment 10, is driven by a sprocket 49.

Figure 5:
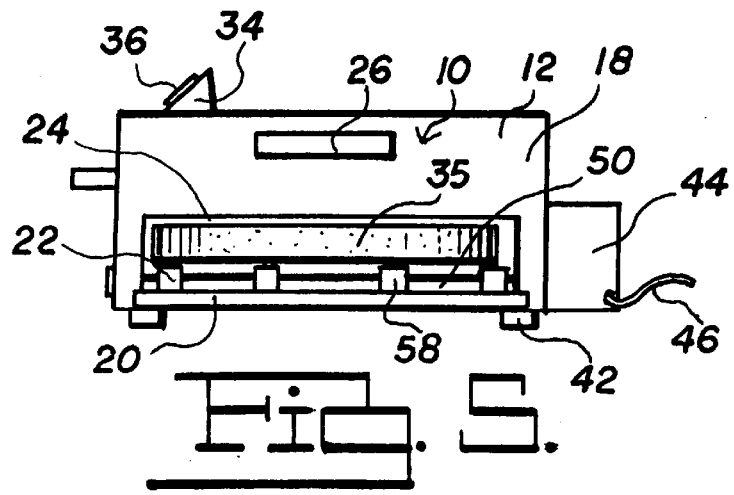

FIG. 5 depicts the exit side wall 18 of the appliance 10 wherein the appliance body 12 has a control/clock assembly 34 further showing the outward extended control knob 36. The appliance 10 is supported by a series of rubber pads 42 displaced at the corners thereof. Extending rearward from the body 12 is an electric motor 44 which has an electricity supply line 46. Further shown is the slice of toasted bread 35, being conveyed by a plurality of chain linked segments 58 comprising the conveyor assembly 22, and further depicting a free axle 50 (one of two) which holds the chain linked segments 58 in unison fixed rotation. Whereas, the toasted slice of bread 35, at the end of the toasting cycle, exits the appliance 10 through an opening 24 in the side wall 18, and onto a hinged tray 20. Located above the opening 24 is the hand well 26 used to grip the appliance 10 while moving it.

While the foregoing embodiments of the present invention are well suited to achieve the above stated objects, those skilled in the art to which it pertains, should realize that such embodiments are subject to modification and change without departing from the scope or spirit, of the present invention. For example, a segmented wire mesh could be used to provide a surface top suitable for carrying french fries through the appliance. The wire mesh, being segmented, would communicate with the chain linked segments and prevent the french fries from falling onto the heating panels. As another example, the top surface of the appliance could incorporate a "hot plate" for warming pots of coffee while another pot is being brewed. In still another example, the appliance could be expanded proportionately for use in commercial enterprises.

Other variations will no doubt occur to those skilled in the art upon the study of the description and drawings contained herein. Accordingly, it is to be understood that the present invention is not limited to the specific embodiments described herein, but should be deemed to extend to the subject matter defined by the appended claims, including all fair equivalents thereof.

Therefore having described and illustrated my new and useful invention in the terms and manners as prescribed by law, I make the following claims:

I claim:

1. An electrical household toasting appliance comprising:
   a base member;
   a body member fastened to said base member, said body member having a top surface, a plurality of side walls and an entrance and an exit located on opposite longitudinal ends thereof;
   a conveyance assembly for transporting food items through said body member from said entrance to said exit at a speed;

a plurality of planer, hinged tray members, at least one extending from each of said entrance and said exit;

a control means for adjusting said speed of said conveyance assembly;

a plurality of heating elements; and a door member being hinged to said body member and having a translucent panel therein for viewing within said body member.

2. The appliance of claim 1, further comprising:

a handle extending outwardly from a top portion of said translucent panel for manipulation of said door member.

3. The appliance of claim 2, further comprising:

a plurality of hand wells, at least one located a side wall of said body member.

4. The appliance of claim 2 wherein said conveyance assembly comprises:

an electrical motor assembly having an axle member extending crossways intermediate of said conveyance assembly and adapted for rotation;

a plurality of chain linked segments extending along the longitudinal axis of said appliance;

a drive axle extending through the center of the chain linked segments being supported at one end by a first tab portion extending from said base member and supported and driven at an opposite end by said motor assembly;

a plurlity of toothed sprockets, each being fixed to said drive axle and each being cooperable with one of said plurality of chain linked segments; and a plurality of undriven axles each being supported at one end by said first tab portion and supported at an opposite end by a second tab portion.

5. The appliance of claim 2 wherein said control means comprises:

a control panel extending upward from said top surface of said body member, said control panel comprising means for setting said speed of said conveyance assembly and a timer.

6. The appliance of claim 2 wherein said heating elements are located both above and below said conveyance assembly.

7. An electrical household toasting appliance comprising:

a base member;

a body member fastened to said base member, said body member having a top surface, a plurality of side walls and an entrance and an exit located on opposite longitudinal ends thereof;

a conveyance assembly for transporting food items through said body member from an entrance to an exit at a speed;

a plurality of planer, hinged tray members, at least one extending from each of said entrance and said exit;

a control means for adjusting said speed of said conveyance assembly;

a plurality of heating elements; and a butter application well located in said top surface of said body member and having a plurality of apertures in a lower surface thereof.

8. The appliance of claim 7, further comprising:

a fixed heating element located in close proximity to said butter application well.

9. The appliance of claim 8, further comprising:

a plurality of hand wells, at least one located a side wall of said body member.

10. The appliance of claim 8 wherein said conveyance assembly comprises:

an electrical motor assembly having an axle member extending crossways intermediate of said conveyance assembly and adapted for rotation;

a plurality of chain linked segments extending along the longitudinal axis of said appliance;

a drive axle extending through the center of the chain linked segments being supported at one end by a first tab portion extending from said base member and supported and driven at an opposite end by said motor assembly;

a plurlity of toothed sprockets, each being fixed to said drive axle and each being cooperable with one of said plurality of chain linked segments; and a plurality of undriven axles each being supported at one end by said first tab portion and supported at an opposite end by a second tab portion.

11. The appliance of claim 8 wherein said control means comprises:

a control panel extending upward from said top surface of said body member, said control panel comprising means for setting said speed of said conveyance assembly and a timer.

12. The appliance of claim 8 wherein said heating elements are located both above and below said conveyance assembly.

13. An electrical household toasting appliance comprising:

a base member;

a body member fastened to said base member, said body member having a top surface, a plurality of side walls and an entrance and an exit located on opposite longitudinal ends thereof;

a conveyance assembly for transporting food items through said body member from said entrance to said exit at a speed;

a plurality of planer, hinged tray members, at least one extending from each of said entrance and said exit;

a control means for adjusting said speed of said conveyance assembly;

a plurality of heating elements;

a door member being hinged to said body member and having a translucent panel therein for viewing within said body member; and a butter application well located in said top surface of said body member and having a plurality of apertures in a lower surface thereof.

14. The appliance of claim 13, further comprising:

a fixed heating element located in close proximity to said butter application well.

15. The appliance of claim 13, further comprising:

a handle extending outwardly from a top portion of said translucent panel for manipulation of said door member.

16. The appliance of claim 13, further comprising:

a fixed heating element located in close proximity to said butter application well; and a handle extending outwardly from a top portion of said translucent panel for manipulation of said door member.

17. The appliance of claim 16; further comprising:

a plurality of hand wells, at least one located a side wall of said body member.

18. The appliance of claim 16 wherein said conveyance assembly comprises:

an electrical motor assembly having an axle member extending crossways intermediate of said conveyance assembly and adapted for rotation;

a plurality of chain linked segments extending along the longitudinal axis of said appliance;

a drive axle extending through the center of the chain linked segments being supported at one end by a first tab portion extending from said base member and supported and driven at an opposite end by said motor assembly;

a plurlity of toothed sprockets, each being fixed to said drive axle and each being cooperable with one of said plurality of chain linked segments; and a plurality of undriven axles each being supported at one end by said first tab portion and supported at an opposite end by a second tab portion.

19. The appliance of claim 16 wherein said control means comprises:

a control panel extending upward from said top surface of said body member, said control panel comprising means for setting said speed of said conveyance assembly and a timer.

20. The appliance of claim 16 wherein said heating elements are located both above and below said conveyance assembly.

* * * * *

UNITED STATES PATENT AND TRADEMARK OFFICE
CERTIFICATE OF CORRECTION

PATENT NO. : 5,839,354
DATED : November 24, 1998
INVENTOR(S) : Alfredo Cardillo

It is certified that error appears in the above-identified patent and that said Letters Patent is hereby corrected as shown below:

Item [57], Abstract, Line 5, "fed" should be --feed--.

Column 1, Line 20, "perch's" should be --perches--.

Column 3, Line 4, "an" should be --and--.

Column 3, Line 40, "on" should be --one--.

Column 3, Line 67, "cutaway" should be --cut away--.

Column 5, line 29, claim 4, "plurlity" should be --plurality--.

Column 6, line 14, claim 10, "plurlity" should be --plurality--.

Column 6, line 65, claim 17, "16;" should be --16,--.

Column 7, line 13, claim 18, "plurlity" should be --plurality--.

Signed and Sealed this

Twenty-first Day of March, 2000

Attest:

Q. TODD DICKINSON

*Attesting Officer*    *Commissioner of Patents and Trademarks*